Feb. 5, 1952 — M. I. TAYLOR — 2,584,305
TEMPERATURE RESPONSIVE VENTILATOR FOR BEEHIVES
Filed April 25, 1947 — 2 SHEETS—SHEET 1
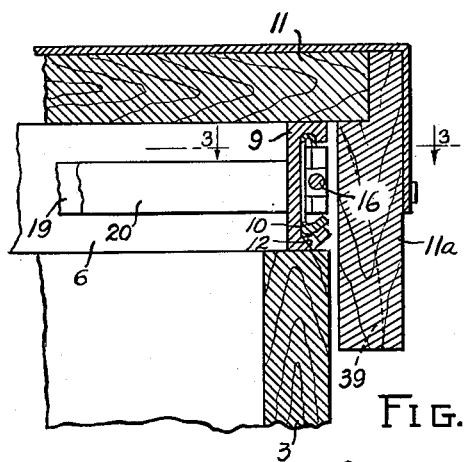
Fig. 2
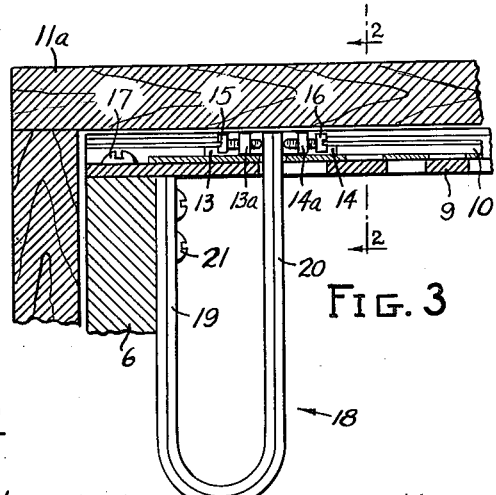
Fig. 3
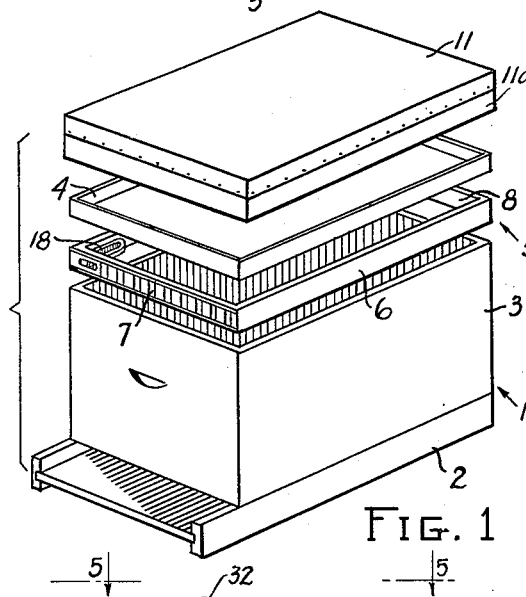
Fig. 1
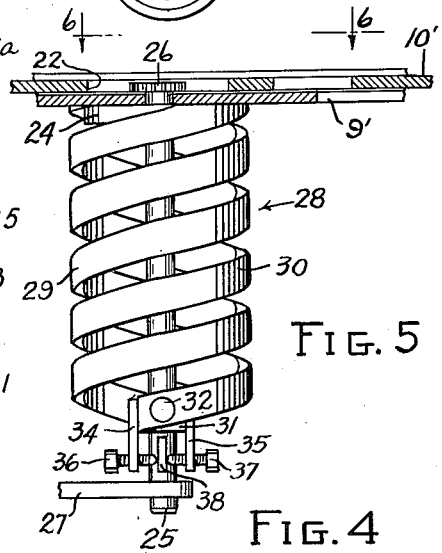
Fig. 5
Fig. 4
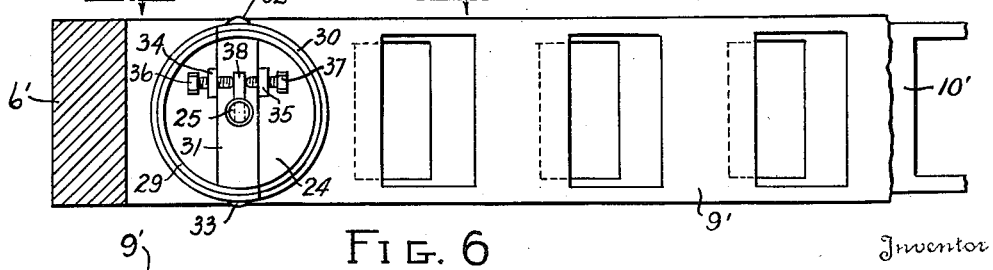
Fig. 6
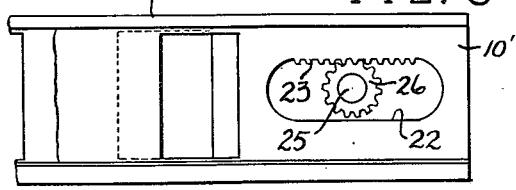
Inventor
MERRITT I. TAYLOR
By Elizabeth Newton Dew
Attorney Feb. 5, 1952          M. I. TAYLOR          2,584,305
TEMPERATURE RESPONSIVE VENTILATOR FOR BEEHIVES
Filed April 25, 1947          2 SHEETS—SHEET 2
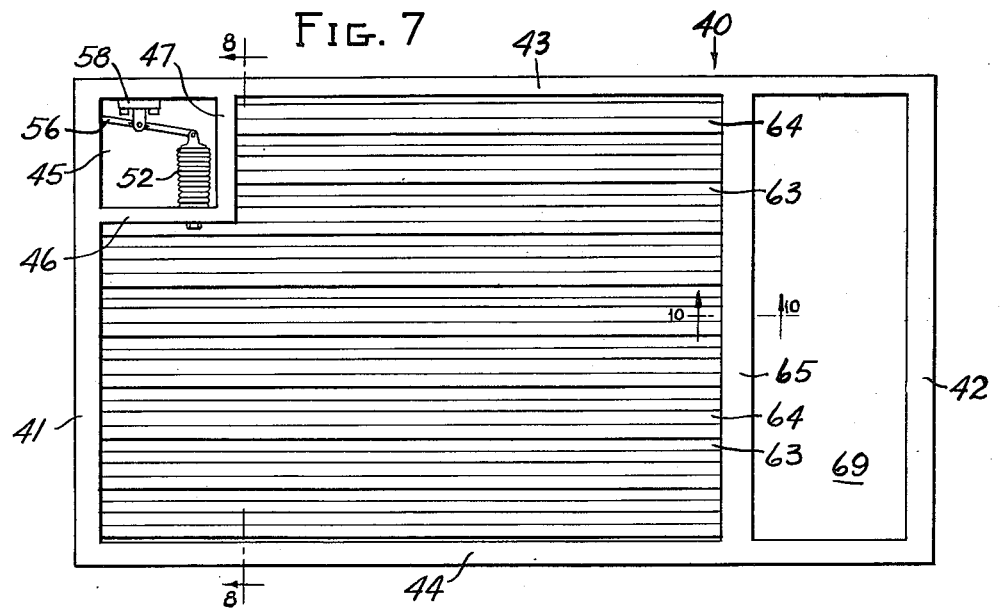
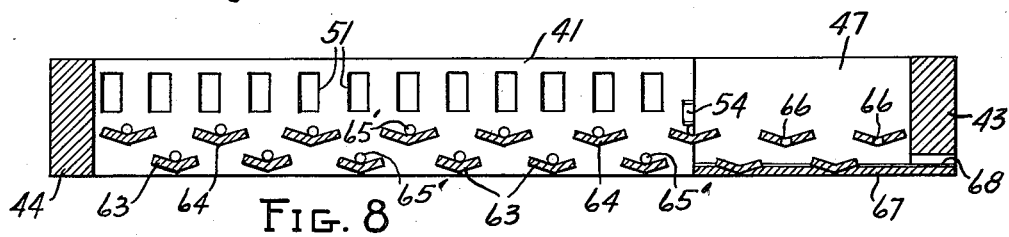
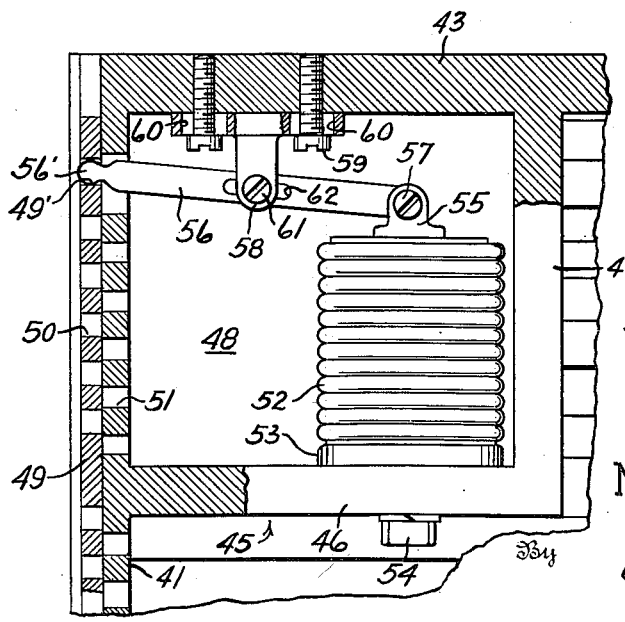
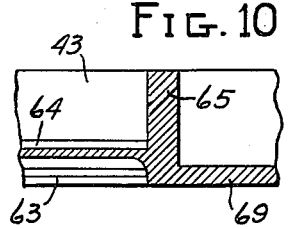
Inventor
MERRITT I. TAYLOR
Elizabeth Newton Dew
Attorney Patented Feb. 5, 1952

2,584,305

UNITED STATES PATENT OFFICE 2,584,305

TEMPERATURE RESPONSIVE VENTILATOR FOR BEEHIVES

Merritt I. Taylor, Richmond, Va.

Application April 25, 1947, Serial No. 743,766

16 Claims. (Cl. 6—1)

This invention relates to ventilators for beehives and, more specifically, to a ventilator which is automatically controlled by the ambient atmospheric temperature. Control of the temperature within a hive is an important consideration with beekeepers. During excessively hot weather, the temperature within a hive may become so excessive as to cause the colony of bees to swarm. The provision of adequate ventilation is not of itself a serious problem, but, when such ventilation is afforded, the hive is too cold, and subject to too rapid changes in temperature during the colder months of the year. As a result of excessive cold, the bee cluster contracts in size and becomes abnormally dense with the result that many of the bees are suffocated. Furthermore, the temperature within the hive may vary widely each day during certain seasons of the year, becoming excessively hot during the day, and too cold at night.

It is obvious too, that a great deal of time will be spent if the beekeeper attempts to adjust the temperature of his hives manually. Where hundreds of hives may be involved, the individual adjustment of ventilators, etc., perhaps twice each day, involves a large expenditure of time, while the beekeeper faces the possibility of serious losses unless he does, in a more or less precise manner, regulate the temperature of the hives.

It is the main and general purpose of my invention to provide a simple attachment or accessory for a beehive, which will solve the foregoing problem and, without effort on the part of the beekeeper, assure adequate and proper ventilation for the colony in spring brood rearing and in hot weather, while conserving the heat generated by the metabolism of the bees in cold weather.

Another object is to provide a top entrance for the bees the year around but one the effective size of which is reduced in cold weather to a single small opening.

A still further object is the provision of a combination of moisture eliminator, which catches and drains the condensate formed from the water vapor given off when the bees are in cluster, together with an automatic heat outlet, top entrance, feeding tray and queen bee excluder.

A further object is the provision of an accessory for beehive which is automatically responsive to the ambient atmospheric temperatures to open ventilation openings during hot weather and to close them during cold weather.

Other objects are the provision of a thermostatically responsive ventilator as aforesaid, which may be quickly applied to an existing hive, which is positive and reliable in operation, which may replace the usual inner cover of a standard hive, and which may be manufactured and sold at a price fully justified by increased honey production per colony, and other favorable results.

Other objects will appear after a study of the following disclosure.

In the drawings:

Figure 1 is a perspective exploded view of a standard beehive showing the relation of my invention with the conventional parts of the hive.

Figure 2 is an enlarged vertical section taken upon a plane indicated by the line 2—2, Figure 3, and showing the ventilating slide, thermo-responsive element, and its connection with the slide, the inner cover being omitted for simplicity of illustration.

Figure 3 is a horizontal section taken substantially upon the line 3—3, Figure 2, showing in detail the calibrating connection between the thermo-responsive element and the ventilator slide.

Figure 4 is a detail view in elevation, of a second form of the invention using a coiled thermostatic element, and showing more particularly the calibrating connection between the bi-metallic spring and the actuating rod.

Figure 5 is a view taken upon the line 5—5, Figure 4, the slides being shown in cross-section to illustrate more clearly the operating pinion.

Figure 6 is an elevation taken upon the line 6—6, Figure 5, and showing the rack and pinion driving connection for the ventilator slide.

Figure 7 is a plan view of a modified form of ventilator combined with a moisture eliminator and feeding tray.

Figure 8 is a section to an enlarged scale taken upon the line 8—8, Figure 7, and showing the construction of the moisture eliminator and feeding tray.

Figure 9 is an enlarged plan, partly in section, of the thermostatic ventilator slide control as used in Figure 7.

Figure 10 is a section taken upon the line 10—10, Figure 7, showing the construction of the moisture collecting troughs.

Referring in detail to the drawing and particularly Figure 1, I identifies a standard rectangular hive having a base 2, a body consisting of side walls 3, inner cover 4 and outer cover 11. Normally, the inner cover 4 rests upon the top edge of walls 3, while the outer cover 11 fits down over and about the inner cover and side walls, in the manner indicated in Figure 2. A dead air insulating space is thus provided between the two covers.

As illustrated in Figure 1, my invention consists of a generally rectangular ventilator frame 5 having side walls 6 and end walls 7 and 8. This frame 5 has substantially the same dimensions as the aforementioned inner cover so that, as illustrated in Figure 2, the skirt portion 11a of outer cover 11 extends down and overlaps walls 3 when the frame is in position. It is intended that the parts shall be so dimensioned that the skirt or walls of the outer cover fit down about and overlap the side walls 3 when both the ventilator frame and inner cover are interposed between the body of the hive and the outer cover. Thus the inner cover may be used with my invention, or omitted, as desired.

One end 7 of the ventilator frame has a main channel member 9 shaped in cross-section as shown at Figure 2. This channel, as well as the entire frame may be made of metal or plastics, the latter being preferred. A slide member 10 has a smooth sliding fit within channel 9. As will be noted from Figure 2, the lower edges of the channel 9 and slide 10 are flanged upwardly at about 45° to the plane of their vertical portions. The flange of slide 10 slightly overlaps that of channel 9 and a number of spaced holes 12 extend through the flange wall of channel 9 downwardly and outwardly. By this construction, the lower surfaces of the members 9 and 10, are kept dry and free from foreign material which might otherwise interfere with the free relative sliding thereof.

At one end ventilator slide 10 has a pair of spaced metals tabs 13 and 14 affixed thereto, each having a respective outstanding lug 13a or 14a. These lugs have aligned threaded holes each receiving a calibrating screw 15 or 16. The ends of main channel 9 are attached to the adjacent ends of side walls 6, as by screws 17.

One leg 19 of a generally U-shaped bi-metallic, temperature responsive element 18 is attached at its end to the adjacent wall 6, as by screws 21. The other and somewhat longer leg projects through a slot in channel 9, an opening in slide 10, and between the confronting rounded ends of screws 15 and 16. The element 18 is so designed as to effect a movement of slide 10 from the position shown at Figure 3 to a position in which corresponding openings in channel 9 and slide 10 are in alignment for a predetermined change in temperature. This change will have an approximate lower limit of 57° F. and an upper limit of 90° F. That is, the openings in channel 9 will be fully closed for a temperature of 57° F. and below, and fully open for a temperature of 90° F. and above. The device may be properly adjusted by subjecting it to an atmospheric temperature of 90° F. and then adjusting screws 15 and 16 until the edge of each opening in slide 10 nearest the screws, is flush with the corresponding edge of the openings in channel 9.

In Figures 4, 5, and 6, I have shown a second modification in which the temperature responsive element comprises a pair of coiled bi-metallic springs. The channel member 9', ventilating strip 10' and side wall 6', are essentially of the same construction as in the species of Figures 2 and 3 and hence need not be described. The slide 10' has a slot 22 therein having rack teeth 23 formed along its upper edge. A disc 24 is fixed to the inner wall of channel 9' and has a central hole aligned with a hole in channel 9'. These holes collectively form one bearing for a shaft 25 which has a pinion 26 on its outer end in mesh with rack 23. The other end of shaft 25 may be journaled in a bracket 27 fixed in any suitable manner to side 6'. This bracket is omitted in Figure 4 for greater clarity of illustration.

The bi-metallic spring, identified generally at 28, comprises two coils 29 and 30, each secured at one end to disc 24 and at its other end to a bar 31 journaled upon shaft 25. Preferably, the ends of the coils 29 and 30 are secured to the bar by pivots 32 and 33, Figure 4, so that they may turn slightly with respect thereto.

Bar 31 has lugs 34 and 35 rigid therewith. These lugs extend parallel with shaft 25 and have aligned threaded holes receiving adjusting screws 36 and 37. A key 38 is fixed in a slot in shaft 25 and extends between the confronting ends of screws 36 and 37. Thus, with temperature changes, as the coils 29 and 30 wind and unwind, shaft 25 is correspondingly turned thereby through bar 31, lugs 34 and 35, screws 36 and 37 and key 38. This turning causes translation of slide 10' in an obvious manner. By adjusting screws 36 and 37 a slight relative angular movement may be effected between bar 31 and key 38 to cause the openings in channel 9' and slide 10' to be fully aligned at and above a desired temperature.

The use of the ventilator will be obvious from the foregoing description. The top and inner covers are lifted off, the ventilator frame positioned on side walls, and the covers replaced. Of course, the inner cover may be left off if desired. If desired, slots, as indicated at 39, Figure 2, may be cut in the inside surface of the end wall 11a, as by means of a dado cutter, there being one slot opposite each ventilator opening. Alternatively, or in addition to the foregoing, the top cover may be tipped in hot weather with the bottom edge of end wall 11a resting on top of channel 9 in a known manner, although this is not at all necessary where my ventilator is used.

At Figures 7 to 10, inclusive, I have shown a hive ventilator operating upon the same principles as those of Figures 1 to 6, and combined with a moisture eliminator as shown and claimed in my co-pending application, Serial Number 724,535, filed January 27, 1947.

A frame generally identified by the numeral 40 consists of end walls 41 and 42 and side walls 43 and 44. This frame may consist of one-piece of metal or plastic. At one forward corner a small compartment 45 is defined by auxiliary walls 46 and 47. This compartment when in position in a hive is intended to be closed at its top side by the inner hive cover, such as 4, Figure 1, and at its bottom side by a special partition 48. The front end wall 41 is channeled, in any suitable manner, to receive and guide in rectilinear motion the slide 49. The wall 41 and slide 49 have equally spaced apertures 50 and 51, adapted in one position to be in alignment to afford ventilating openings to the interior of the hive, and in a second position to be out of alignment to cut off or close such openings in the manner shown at Figure 9. These openings also afford communication between compartment 45 and the ambient atmosphere; and because of the aforesaid walls 46 and 47, the partition 48 and inner cover, the compartment is effectively separated from the remainder of the interior of the hive. Furthermore, if desired, the openings in wall 41 to the interior of this compartment may be so narrow as to exclude bees from entrance thereto. Thus the thermostat in the compartment is rendered more sensitive to changes in the outside atmosphere than would be the case were it always more or less sealed, while access of bees thereto is prevented.

A bellows type thermostat 52 has its base 53 fixed to wall 46 as by nut 54. The other end of the thermostat has a pair of spaced lugs one of which is identified at 55, receiving between them one end of a lever 56. A pin 57 pivotally connects the lever to the thermostat. A pivot bearing 58 is adjustably connected to wall 43 as by means of screws or bolts 59 and slots 60. The bearing supports a fulcrum pin 61 which passes through a slot 62 in lever 56. The other end of lever 56 has a circular head 56' which fits a slot 49' in slide 49. In Figure 9, the bellows or "Sylphon" is shown in contracted or cold weather position and the ventilator openings are fully closed. This position will be maintained up to about 57° F. At higher temperatures bellows 52 expands and gradually moves slide 49 to fully open the ventilator at and above 90° F. By loosening screws 59 and shifting bearing 58, the ventilator may be adjusted to be fully open or fully closed, at any desired or selected temperature.

The ventilator openings 51 may have a width of $\frac{1}{16}$" to 1" and form a top entrance for the bees during the working season. Furthermore, it is contemplated that one central opening in slide 49 may be elongated so as to leave one ventilator opening 51 unobstructed at all times. The bees may thereby be provided with one top entrance during the cold season thus enabling the lower entrance to be closed during the cold season to prevent drafts and to exclude rodents. At the same time, the hive is effectively closed to retain the heat given off by the cluster and to thereby maintain the interior of the hive at a healthful temperature without packing or artificial heat.

The foregoing beneficial effects are aided by the moisture eliminator which may form an integral part of the frame 40. This eliminator comprises a plurality of trough elements 63 and 64, preferably V-shaped in cross-section and extending longitudinally of the frame between auxiliary wall 65, on the one hand, and front wall 41 and auxiliary wall 47, on the other hand. These troughs may be formed as an integral part of the ventilator, or they may be fixedly attached to the frame. As clearly shown upon Figure 8, the troughs are located in planes below the level of ventilator openings 50 and 51 and troughs 64 are positioned in a plane above the plane of troughs 63. The troughs are so dimensioned that the edge of each trough 64 overlaps in a horizontal direction, the edge of the trough 63 therebeneath so that all moisture condensing upon the inner cover and dropping therefrom, is trapped and conveyed to the exterior of the hive. This function is effected in those troughs abutting front wall 41, by holes 65' through wall 41 in alignment with the bottoms of the troughs. In those troughs abutting auxiliary wall 47, the condensate passes through holes 66 in the ends of the troughs, drops upon a ledge or channel 67 and thence through a hole 68 in wall 43, to the exterior of the hive. The clearance between troughs is, of course, sufficient to permit passage of workers.

The auxiliary wall 65 is spaced from and parallel with end walls 41 and 42 as shown at Figure 7 and has an integral floor 69 forming with the surrounding walls a feeding tray for use in a manner known to beekeepers. The walls 65 also acts as a brace or reenforcement for the frame.

In operation of the species of Figures 7 to 10, inclusive, the top and inner covers are removed, frame 40 is placed so as to rest upon the side walls of the hive with slide 49 at the front. Any necessary adjustment of bracket 50 is effected and the covers are replaced as previously.

During times when the temperature is from approximately 57° F. to 90° F. the bellows 52 will be partly expanded from the fully contracted position shown at Figure 9. Lever 56 will thus be pivoted counterclockwise and slide 49 will be moved to open the ventilators by amounts generally proportional to the temperature. For all temperatures from 90° and above the ventilator will be fully open. Since the compartment is thus open to the atmosphere for all temperatures above 57° F. the thermostat is rapidly responsive, as it should be, to any drop to 57° F., when the ventilators become fully closed.

The operation of the moisture remover is explained in my co-pending application previously referred to, and may be resumed as follows: During cold weather the bees are in cluster over and about the frames. Carbon dioxide, water vapor and heat are given off by the cluster as a result of the metabolic processes of the bees. The moist vapor rises and, passing through the interstices between troughs 63 and 64, contacts the cold lower surface of the inner cover 4. The temperature of the vapor is there lowered to or below the dew-point whereupon, moisture condenses in drops upon the inner cover and falls into the troughs, thence passing off to the exterior of the hive. The cooled and de-humidified air then drops to the bottom of the hive and may recirculate through the cluster. In this manner, I use the natural metabolic processes of the cluster to establish a circulation of air within the hive, remove excess moisture, de-humidify the air, and remove the condensate to the exterior of the hive. The air within the hive is thus kept at a low relative humidity which prevents mouldy combs, dysentery, spring dwindling and eliminates the need for winter packing. The automatic ventilator and moisture eliminator combine to keep the air in the hive warm in winter and relatively cool in summer. Excessive moisture is removed at all times. As a result, a healthful condition is maintained within the hive through the year.

While I have shown several species of the invention numerous alterations, rearrangements and substitutions of equivalent construction are possible and will readily occur to the skilled beekeeper after a study of the present disclosure. For example, the ventilator slides may be formed as one side of the frame, or two or more ventilators may be used in each frame. Also various known temperature responsive elements may be substituted for the ones shown. Hence, the disclosure is to be taken in an illustrative, rather than a limiting sense; and it is my intention and desire to reserve all such modifications as fall within the scope of the subjoined claims.

Having now fully disclosed my invention, what I claim and desire to secure by Letters Patent is:

1. A ventilator for a beehive having closed side walls generally rectangular in shape, said ventilator comprising a rectangular frame adapted to rest on and be supported by the upper edges of said side walls, at least one side of said frame having a plurality of spaced apertures extending transversely therethrough, a slide, means mounting said slide for horizontal movement on and along said one side, said slide having apertures adapted in a first position, to align with the respective apertures of said side and in a second position to close the apertures in said side, thermostatic means fixedly mounted on said frame and responsive to ambient atmospheric temperature and an operating connection between said slide and thermostatic means to move said slide between said first and second positions in response to a predetermined change of ambient temperature.

2. The combination with a beehive rectangular in horizontal cross section and having closed side walls and a top adapted to fit over and about said walls, of a ventilator comprising an open rectangular frame having side and end walls conforming generally to the shape of, and resting on said side walls in interposed relation between said side walls and said top and substantially covered by said top with the latter in position on the hive, at least one wall of said frame having spaced ventilating apertures therethrough, a ventilator slide having correspondingly spaced apertures, means mounting said slide on said frame for translation from a first position in which each aperture therein is aligned with a corresponding aperture in said frame wall, to a second position in which said slide fully closes the apertures in said frame wall, and temperature responsive means carried by said frame and connected with said slide to move the same between said positions in response to predetermined change of ambient atmospheric temperature, said ventilator having no positive connection with any portion of the hive, whereby the ventilator may be quickly positioned and removed.

3. In a ventilator for beehives, a rectangular frame having opposed sides and ends, there being regularly-spaced apertures in and along one side of said frame extending transversely therethrough, a strip having corresponding spaced apertures therethrough and mounted for longitudinal sliding on and along said apertured side from a first position in which each said aperture therein is aligned with a corresponding aperture in said side, to a second position in which said apertures are out of alignment, a U-shaped bi-metallic thermo-responsive element having one leg attached to said frame within the confines thereof and the other leg attached to said slide, said element being operable to positively move said slide from said second to said first position for a predetermined increase of ambient atmospheric temperature.

4. In a ventilator for a beehive, a frame comprising side walls adapted to rest upon and be supported by the walls of said hive, one said side wall having spaced ventilating apertures therethrough, said wall being channeled to slidably receive a slide having apertures therethrough and movable from a first position in which each aperture in said wall is aligned with an aperture in said slide, to a second position in which said apertures in said wall are fully closed by said slide, a pair of spaced lugs at one end of said slide, an adjustment screw threaded in each lug, said screws being in alignment and having confronting ends, and a U-shaped bi-metallic spring having one free end attached to said frame and the other free end extending between said screws.

5. In a ventilator for a beehive having side walls and a cover having a skirt portion fitting down over and about said side walls, a frame having closed walls and an open top and bottom, said walls being adapted to rest on the walls of said hive and form extensions thereof, one said wall of said frame having spaced ventilator openings therethrough, a slide translatably mounted on said one wall and having corresponding openings therethrough adapted to be moved into and out of alignment with respective openings of said wall, a shaft journaled in said frame, a thermostatic coiled spring having one end secured to said one wall, means operatively connecting said shaft to translate said slide, and adjustable means connecting the other end of said spring to said shaft.

6. In a ventilator as recited in claim 5, said last-named means comprising a bar journaled on said shaft, a pair of spaced lugs on said bar and offset from the axis of said shaft, an adjustment screw threaded into each lug, said screws being in alignment and having confronting ends, a key secured to said shaft and projecting between the confronting ends of said screws, said other end of the spring being pivoted to said bar.

7. A ventilator for beehives, a rectangular frame adapted to rest upon the side walls of the hive and to be covered and protected by the top thereof, said frame comprising a side wall having spaced ventilator openings therethrough, a slide having correspondingly spaced openings therethrough, means mounting said slide on said wall for movement between positions in which respective openings are in and out of alignment, a lever having a central longitudinal slot, a fulcrum bearing secured to said frame, a sliding pivotal connection between one end of said lever and said frame, a thermostatic element carried by said frame, a pivotal connection between said element and the other end of said lever, a fulcrum pin mounted in said bearing and passing through said slot, and means mounting said bearing for adjustment substantially parallel with said lever.

8. In an automatic ventilator and moisture eliminator for a beehive, a frame having side walls and a third wall parallel to and intermediate said side walls, one said side wall having horizontally spaced openings through and along said wall adjacent the upper portion thereof, a slide having correspondingly spaced openings slidably mounted on said one wall, temperature responsive means carried by said frame and connected to operate said slide to move each opening in said slide into and out of alignment with a respective opening in said wall, upper and lower sets of spaced parallel troughs, each having one end carried by said one wall and its other end carried by said third wall, each said set lying in a respective substantially horizontal plane below said openings, the edge of each trough in said upper set overlapping the adjacent edge of a trough in said lower set, the troughs in one set being horizontally offset with respect to the troughs of the remaining set.

9. A temperature responsive ventilator and moisture eliminator for a beehive comprising a rectangular frame having side walls, one said wall having spaced ventilator openings therethrough, temperature responsive means carried by said frame, means under the control of said temperature responsive means to open and close said openings in response to a predetermined variation in ambient temperature, an auxiliary wall between two said walls and parallel to said one wall, substantially horizontal parallel moisture-collecting troughs extending between and carried by said one wall and said auxiliary wall in a plane below said ventilator openings, successive troughs having overlapping edges, and a floor closing the opening between said auxiliary wall, the wall opposite said one wall and the two remaining side walls to thereby form a feeding tray.

10. In combination with a beehive generally rectangular in horizontal cross-section, a rectangular frame having end and side members adapted to rest upon and be supported by, the end and side walls of the hive, one said end member having a first series of longitudinally-spaced apertures extending therethrough, a slide having a second series of spaced apertures therethrough, means mounting said slide for translation on said one end member from a first position in which respective apertures of said end member and slide are aligned, to a second position in which said apertures are out of alignment, a thermostatic element carried by said frame, and a mechanical connection between said element and slide to move said slide from first to second position in response to a predetermined decrease of ambient temperature.

11. A temperature responsive ventilator and moisture eliminator for a beehive comprising a rectangular frame having end and side walls adapted to rest upon the corresponding walls of a hive, and an intermediate wall extending between said side walls between and parallel with said end walls, there being a series of spaced apertures along and through one said end wall, slide means movably mounted on said one end wall between a first position and a second position to respectively open and close said apertures, means responsive to ambient temperature mounted on said frame and connected to operate said slide means to move the same between said first and second positions, a first and second series of troughs each trough having its one end fixed in said one end wall below said apertures and its other end carried by said intermediate wall, each series of troughs lying in respective vertically spaced planes substantially parallel with said frame, the edges of the troughs of said upper series being spaced from and overlapping the adjacent edges of the troughs of the lower series, there being a drain opening through said one end wall in communication with the bottom of each respective trough.

12. A ventilator and moisture eliminator as recited in claim 11, said frame including a bottom between said intermediate wall, the other said end wall and said side walls to form therewith, a feeding tray.

13. In a ventilator for a beehive, a rectangular frame adapted to be supported by the upper edges of the side walls of the hive, said frame comprising united side and end walls, and an intermediate wall, first and second auxiliary walls forming a chamber with one side and one end wall at their meeting corner, there being a plurality of spaced ventilating apertures through said one end wall including at least one aperture opening into said chamber, slide means mounted on said one end wall and movable thereon from a first position unobstructing said apertures, to a second position closing said apertures, thermostatic means fixedly mounted within said chamber, and an operating connection between said thermostatic means and said slide means, said thermostatic means, connection and slide means being so constructed and arranged as to close said apertures at a predetermined low temperature and to open said apertures at a higher temperature.

14. A ventilator as recited in claim 13, said operating connection comprising a lever having a slot intermediate its ends, a bracket mounted in said chamber for limited adjustment longitudinally along said lever, a pivot for said lever carried by said bracket and extending through said slot, and a pivotal connection between the ends of said lever and said slide means and thermostatic means, respectively.

15. In an attachment for a beehive, an open rectangular frame adapted to rest upon and be supported by the walls of said hive, there being a plurality of ventilating apertures through one wall of said frame, slide means movably mounted on said one wall to open and close said apertures, temperature responsive means carried by said frame, an operating connection between said slide means and said temperature responsive means, and a plurality of normally horizontal troughs fixed at one end to said one wall beneath said apertures, said troughs lying within the confines of said frame and having spaced overlapping adjacent edges, there being a drain opening from the bottom of each trough through said one wall.

16. An attachment as recited in claim 15, a supplemental wall extending from one side wall to the other of said frame, said troughs at their ends remote from said one wall being fixed to said supplemental wall, and a bottom between said supplemental wall, said side walls and the other end wall to form therewith a feeding tray.

MERRITT I. TAYLOR.

REFERENCES CITED

The following references are of record in the file of this patent:

UNITED STATES PATENTS

| Number | Name | Date |
| --- | --- | --- |
| 185,194 | Snider | Dec. 12, 1876 |
| 373,324 | Wheeler | Nov. 15, 1887 |
| 395,382 | Crowell | Jan. 1, 1889 |
| 1,358,193 | Fulton | Nov. 9, 1920 |
| 1,435,118 | Heim et al. | Nov. 7, 1922 |
| 1,973,620 | Gille | Sept. 11, 1934 |
| 2,232,343 | Sauter | Feb. 18, 1941 |
| 2,400,674 | Williams | May 21, 1946 |
| 2,434,090 | Alton | Jan. 6, 1948 |